United States Patent [19]

Amacker

[11] Patent Number: 4,742,888
[45] Date of Patent: May 10, 1988

[54] FOLDING LADDER STAND

[76] Inventor: Joseph A. Amacker, Rte. 3, Box 41, Tallulah, La. 71282

[21] Appl. No.: 937,491

[22] Filed: Dec. 3, 1986

[51] Int. Cl.⁴ .................. A45F 3/26; A01M 31/02
[52] U.S. Cl. ................... 182/116; 182/163; 182/187
[58] Field of Search ............... 182/187, 188, 93, 169, 182/116, 163

[56] References Cited

U.S. PATENT DOCUMENTS

| | | |
|---|---|---|
| 2,046,516 | 7/1936 | Johnson ............................. 182/169 |
| 3,057,431 | 10/1962 | George . |
| 3,336,999 | 8/1967 | McSwain . |
| 3,630,314 | 12/1971 | Bamburg et al. . |
| 3,703,939 | 11/1972 | Maxwell . |
| 4,134,474 | 1/1979 | Staveneau et al. . |
| 4,246,981 | 1/1981 | Stavenau . |
| 4,257,490 | 3/1981 | Bandy . |
| 4,331,217 | 5/1982 | Stecklow . |
| 4,411,335 | 10/1983 | Forrester .......................... 182/187 |
| 4,475,627 | 10/1984 | Eastridge .......................... 182/187 |
| 4,549,635 | 10/1985 | Early ................................ 182/187 |
| 4,552,246 | 11/1985 | Thomas . |
| 4,552,247 | 11/1985 | Purdy . |
| 4,579,198 | 4/1986 | Lee ................................... 182/187 |
| 4,625,831 | 12/1986 | Rodgers ............................ 182/116 |

FOREIGN PATENT DOCUMENTS

| | | | |
|---|---|---|---|
| 1199190 | 6/1959 | France ............................. 182/169 |
| 238647 | 11/1945 | Switzerland ..................... 182/169 |

Primary Examiner—Reinaldo P. Machado
Attorney, Agent, or Firm—Wigman & Cohen

[57] ABSTRACT

A folding ladder stand which is adapted to be attached to a tree includes a ladder frame having an upper portion and a lower portion, a platform supported on the upper portion of the ladder frame, a collapsible seat mounted above the platform and means for attaching the platform to the tree. A rigid, stand-off member is provided adjacent the lower portion of the ladder frame, with the stand-off member being provided with further means for attachment to the tree. Separate means for attaching the seat and the platform to the tree are also provided. The seat includes a seating frame and a fabric member supported on the seating frame, the fabric member serving as the seat for the user of the ladder stand.

22 Claims, 4 Drawing Sheets

FOLDING LADDER STAND

BACKGROUND OF THE INVENTION

The present invention relates to a folding ladder stand and more particularly to a folding ladder stand with a top mounted platform for attachment to a tree and a collapsible seat mounted above the platform.

A combination ladder and tree stand platform with a seat mounted above the platform is known in the prior art. Examples of such prior art are U.S. Pat. Nos. 4,257,490 to Bandy, which discloses a rigid seat 60 which is foldable to a vertical stored position (FIG. 4); 4,552,247 to Purdy, which discloses a chain and turnbuckle arrangement 70, 74 at the seat 76 for engaging about the trunk of a tree; and, 4,246,981 to Stavenau, having a pivotably folding ladder. U.S. Pat. No. 4,331,217 to Stecklow discloses a step and stabilizer attachment for a rung-type ladder for engaging a wall. Additional patents which disclose folding ladder stands are U.S. Pat. Nos. 3,057,431 to George; 3,336,999 to McSwain; 3,630,314 to Bamburg; 3,703,939 to Maxwell; 4,134,474 to Stavenau et al; and 4,552,246 to Thomas.

Although the broad concept of a combination foldable ladder and tree stand with a collapsible seat is taught by the prior art, such prior art combination foldable ladders and tree stands are very unstable, particularly at the lower end of the foldable ladders, and are consequently very unsafe to climb and use. Furthermore, where such prior art combination foldable ladders and tree stands have a separate seat which is mounted above a platform, no means for attaching both the seat and the platform to the tree are provided, further increasing the instability and the danger inherent in using these prior art devices. Finally, such prior art combination foldable ladders and tree stands having a separate seat mounted above a platform use a rigid seat which is cumbersome to position and use and which increases the weight of the device, an important consideration in view of the fact that the devices are generally carried by the user to the location where they are utilized.

SUMMARY AND OBJECTS OF THE INVENTION

In view of the foregoing limitations and shortcomings of the prior art devices as well as other disadvantages not specifically mentioned above, it should be apparent that there still exists a need in the art for a folding ladder stand which is stable when attached to a tree and secure to climb and use, as well as light in weight and easy to transport. It is, therefore, a primary objective of the invention to fulfill that need by providing a combination folding ladder and tree stand which is stable when unfolded and positioned on a tree for climbing and which is secure and stable when the user is in place on the tree stand and using the stand for observation or hunting.

More particularly, it is an object of this invention to provide a combination folding ladder and tree stand having a collapsible seat positioned above a platform disposed at the upper end of the ladder in which both the seat and the platform are secure and stable when the user is using the seat and platform for observation and hunting.

It is another object of the invention to provide a combination folding ladder and tree stand having a safe and comfortable collapsible seat.

Still another object of the invention is to provide a combination folding ladder and tree stand which is easy to carry, convenient to store and light in weight.

Briefly described, the aforementioned objects are accomplished according to the invention by providing a folding ladder frame having an upper portion supporting a platform which is provided with means for attachment to a tree, and a lower portion which is provided with a rigid stand-off member connected at one end to the lower portion of the ladder frame and having means at the other end for attachment to the tree. A collapsible seat mounted above the platform has separate means for attachment to the tree. The collapsible seat has a foldable frame which supports a fabric member and serves as the seat for the user. The entire combination folding ladder and tree stand may be folded down into a single compact unit for easy transportation and storage.

With the foregoing other objects, advantages and features of the invention that will become hereinafter apparent, the nature of the invention may be more clearly understood by reference to the following detailed description of the invention, the appended claim and to the several views illustrated in the attached drawings.

DETAILED DESCRIPTION OF THE PREFERRED EMBODIMENTS

Figure 1:
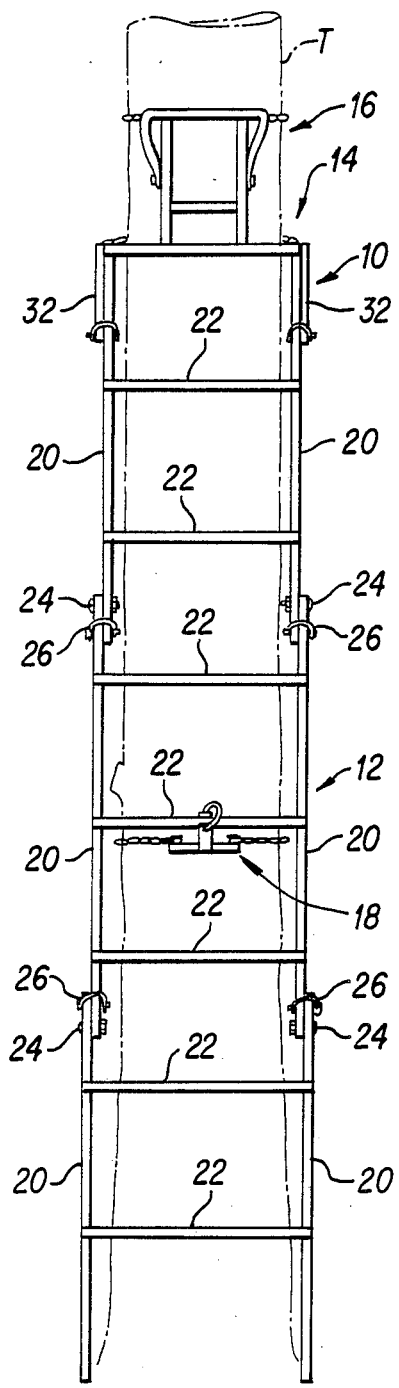
FIG. 1 is a front elevational view of the folding ladder stand of the present invention, in place on a tree.

The folding ladder stand of the invention is illustrated generally in the various figures of the drawing by numeral 10 and is shown in position around a tree T. While a tree has been illustrated in the figures accompanying the present specification, it is to be understood that any type of vertical post or upright, such as a telephone pole, may be substituted therefore.

Figure 2:
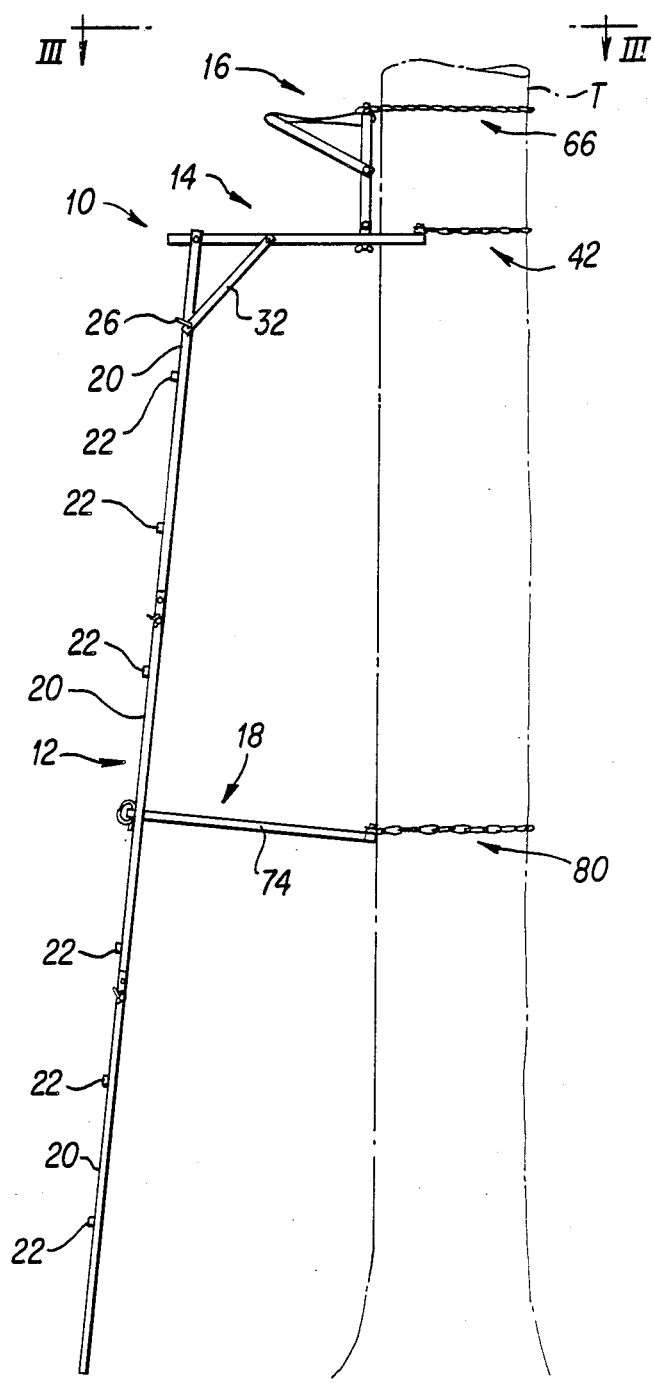
FIG. 2 is a side elevational view of the folding ladder stand of FIG. 1.

Referring specifically to FIGS. 1 and 2, the folding ladder stand 10 is illustrated supported against tree T.

Folding ladder stand 10 comprises a folding ladder, illustrated generally by numeral 12, a top platform, illustrated generally by the numeral 14, supporting a seat, generally illustrated by the numeral 16, and a stabilizer bar, generally illustrated by the numeral 18.

Folding ladder 12 comprises three segments each having opposed side rails 20 connected by rungs 22. Side rails 20 are fabricated from square tubular steel sections, and rungs 22 are fabricated from square tubular steel sections of a somewhat smaller outer dimension. Rungs 22 are welded at their ends to opposite side rails 20 so as to provide a strong and sturdy connection therebetween. Holes are provided at the upper ends of the lower segment of folding ladder 12 in opposed side rails 20, at both ends of the middle segment of folding ladder 12 in opposed side rails 20, and at the lower end of the upper segment of folding ladder 12 in opposed side rails 20. Suitable fasteners such as bolts 24 are disposed within the corresponding holes in the upper ends of the lower segment, the lower end of the middle segment, and the lower end of the upper segment and the upper end of the middle segment of folding ladder 12 so as to firmly connect the three segments yet allow them to be pivoted relative to one another when ladder 12 is folded. An additional set of holes is provided in the upper end of the lower segment of folding ladder 12, at both ends of the middle segment of folding ladder 12, and at the lower end of the upper segment of folding ladder 12. A plurality of quick release fasteners 26 are provided in the corresponding holes in the upper end of the lower segment, the lower end of the middle segment, and the lower end of the upper segment and the upper end of the middle segment of folding ladder 12. Quick release fasteners 26 are preferably of the type known as a "quick-pin". A quick-pin is a commercially available fastener comprising a bolt having an unthreaded shaft and an arcuate, stiff spring member pivotally engaging the head of the bolt. The arcuate spring member terminates in a triangular opening which may be slid over the end of the bolt to lock the bolt in place by flexing the stiff arcuate spring. Other quick release devices may be substituted for the quick-pin, if desired. Due to the combination of bolts 24 and quick release fasteners 26, the folding ladder 12 may be held rigidly and securely extended to its full length, or may be readily folded for transportation and storage by removal of quick release fasteners 26 and by pivoting the three segments relative to each other. Furthermore, the length of the rungs 22 of the lower segment of folding ladder 12 is greater than the length of rungs 22 of the middle segment of folding ladder 12 which are also greater in length than the rungs 22 of the upper segment of folding ladder 12. This allows the three segments to be telescopically received within one another when the segments are folded for transportation and storage.

Figure 3:
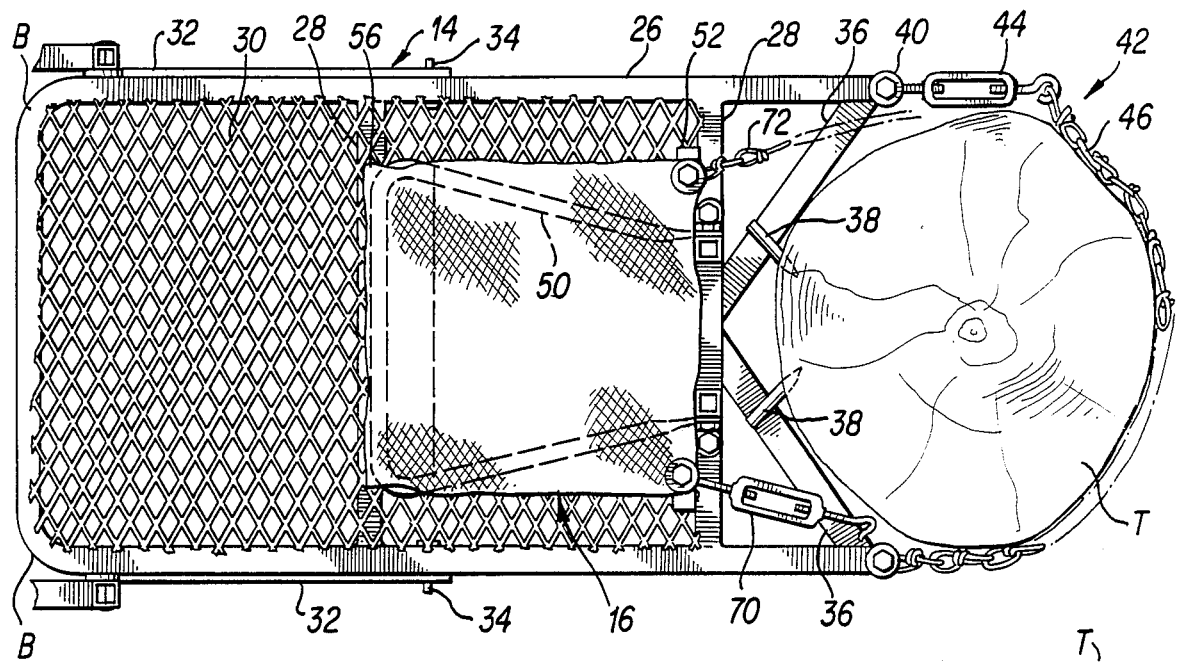
FIG. 3 is a plan view of the folding ladder stand of the invention taken along line III—III of FIG. 2.
Figure 4:
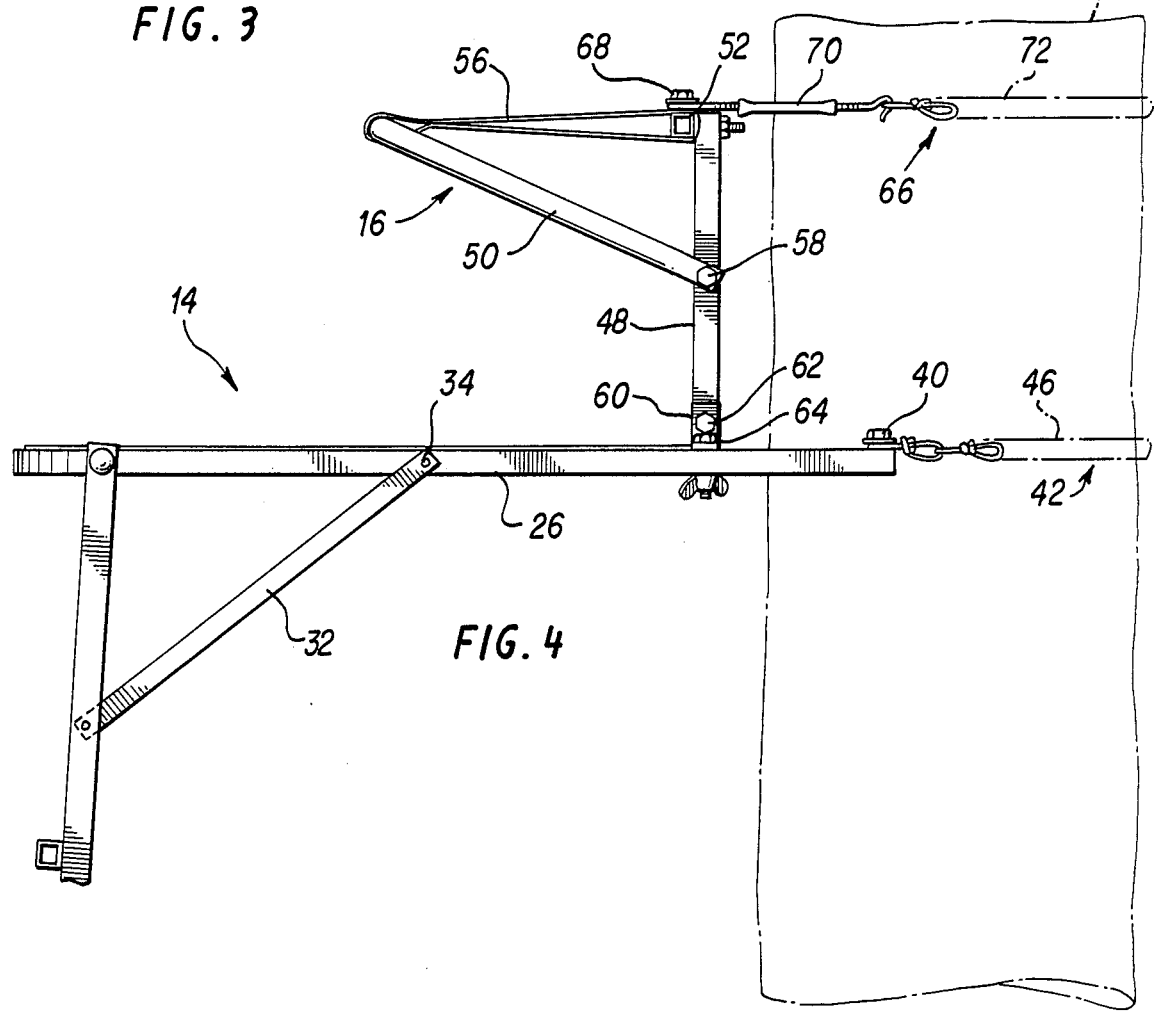
FIG. 4 is a partial enlarged side view of the folding ladder stand of the present invention showing the construction and attachment of the top horizontal platform and folding seat in position in a tree.

Referring now to FIGS. 3 and 4 with further reference to FIGS. 1 and 2, the construction of top platform 14 and seat 16 are illustrated in greater detail.

Top platform 14 comprises a platform frame 26, fabricated from a square tubular steel bar which has been bent at 90-degree angles at two places illustrated by the letter B in FIG. 3 to form a U-shaped member having opposite platform frame arms adapted to flank a tree. Lateral crossbars 28 are welded to tubular frame 26 for rigidity and support of the top platform 14. A wire mesh platform 30 is welded to the upper portion of top platform 14 to provide support for the feet of the user of the platform. A pair of longitudinally extending side bars 32 are pivotally supported on the outer side portions of the tubular frame 26 by bolts 34 which extend through holes formed in platform frame 26. Side bars 32 may be pivoted so as to extend longitudinally with the tubular frame 26 when the folding ladder stand 10 is in its folded position for transport or storage, and may be pivoted about bolts 34 for attachment to opposite side rails 20 by quick release fasteners 26 for horizontal support of top platform 14 when it is fixed to the tree T for use.

An angle bracket comprising two angle members 36 is welded at the underside of platform frame 14, at the center of the crossbar 28 and the ends of platform frame 26 which are closest to the tree T when the tree stand is positioned for use. Sharpened stakes 38 are also welded to angle members 36 to firmly secure top platform 14 against tree T. Connected to the ends of tubular frame 26 which are the closest to tree T when the ladder stand is positioned against the tree for use, by means of bolts 40, is a means 42 for attaching top platform 14 to tree T. Attachment means 42 comprises a commercially available turnbuckle 44 and chain 46.

Figure 6:
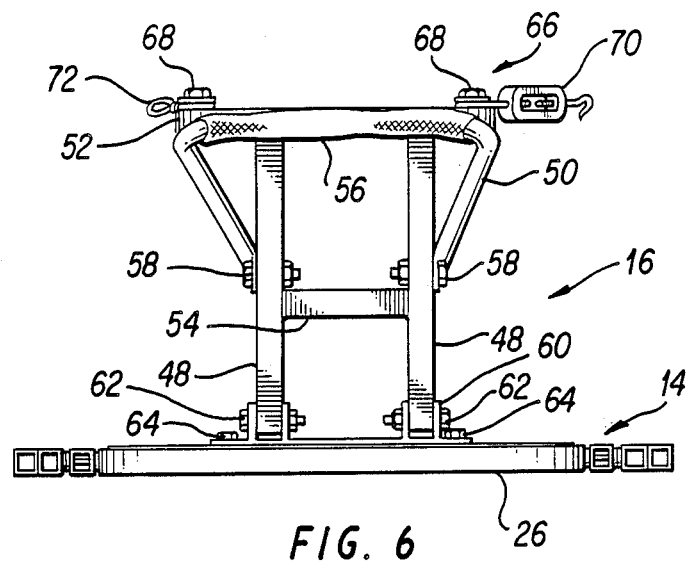
FIG. 6 is a front elevational view of a portion of the folding ladder stand of the invention illustrating the seat and top horizontal platform thereof.

Referring now to FIG. 6, with further reference to FIGS. 3 and 4, the construction of collapsible seat 16 and its means for attachment to tree T are illustrated in detail. Collapsible seat 16 comprises a pair of central supports 48, a bent tubular angular seat support 50, an upper cross member 52, and a lower cross member 54. A fabric member 56 is stretched between angular seat support 50 and upper cross member 52, providing a comfortable, light weight, yet secure and stable seat for the user. In the preferred embodiment fabric member 56 is fabricated from a sturdy, canvas material. Both upper cross member 52 and lower cross member 54 are welded to central supports 48 to provide a rigid support for the seat. Angular seat support 50 is pivotably connected with central supports 48 by means of bolts 58 which are disposed within corresponding holes formed in the ends of tubular angular seat support 50 and the approximate mid-section of central supports 48. Central supports 48 are also pivotably connected to top platform 14 by means of a bracket 60 and bolts 62 disposed in corresponding holes formed in the lower ends of central supports 48 and a pair of flanges formed by bracket 60. Bracket 62 is rigidly fixed to top platform 14 by means of bolts 64.

A means 66 for attaching seat 16 to tree T is connected to seat 16 by means of bolts 68 disposed in holes formed in upper cross member 52. Means 66 for attaching seat 16 to tree T comprises a conventional, commercially available turnbuckle 70 and chain 72. By providing both means 66 for attaching seat 16 to tree T and separate means 42 for attaching platform 14 to tree T, a stable and secure seating arrangement is provided, insuring the safety of the user to a degree which has been heretofore unknown in the prior art.

Figure 7:
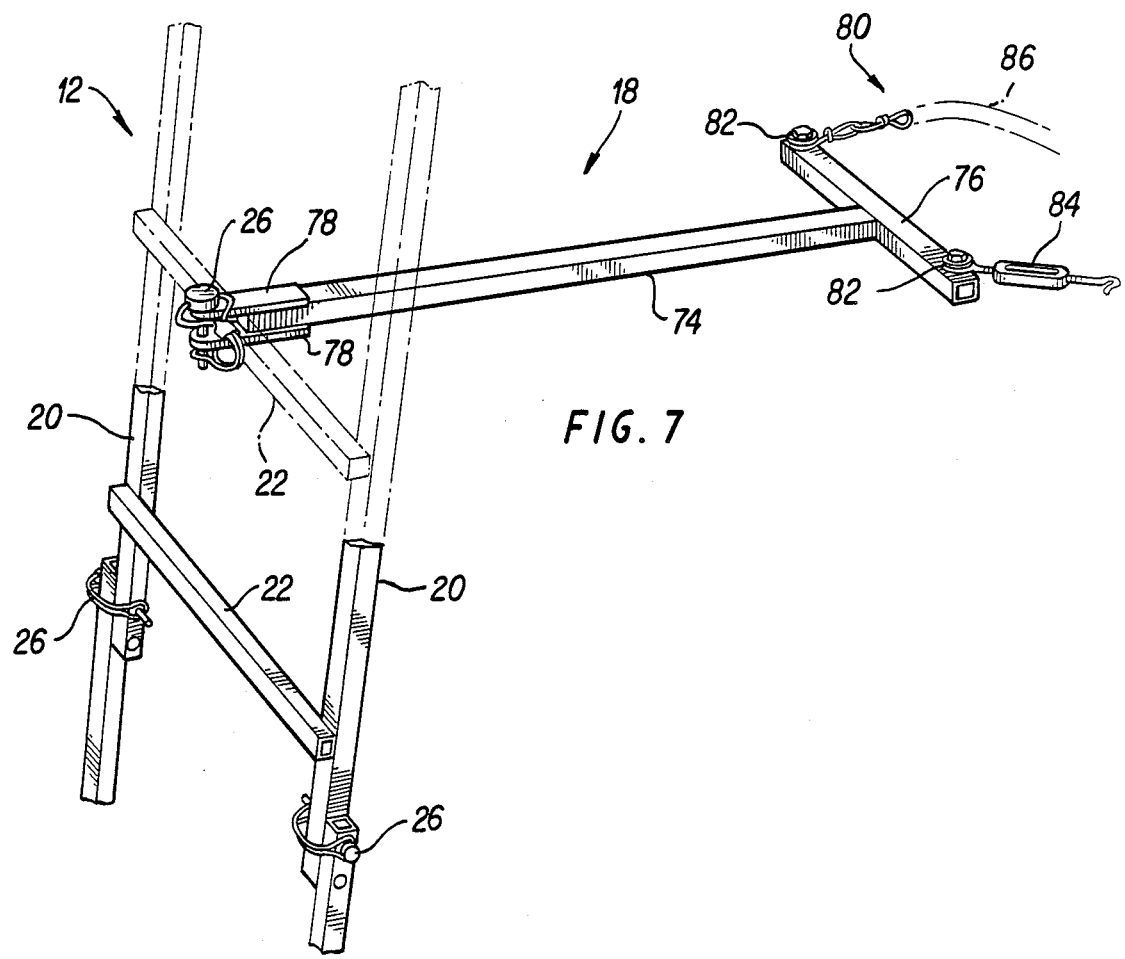
FIG. 7 is a perspective view of the lower portion of the folding ladder stand of the invention illustrating the safety bar standoff feature thereof.

Referring now to FIG. 7, with further reference to FIGS. 1 and 2, the stand-off stablizer safety bar of the invention is illustrated in greater detail. Stablizer bar 18 comprises a stand-off member 74 which is fabricated from a length of square steel tubing, the outer dimension of which is somewhat larger then the outer dimension of ladder rungs 22 which are welded to opposite ladder rails 20 of folding ladder 12. Welded at one end of stand-off member 74, perpendicularly to the longitudinal axis of stand-off member 74, is a cross member 76, while at the other end of stand-off member 74, a pair of wings 78 are welded to the top and bottom surfaces, respectively, of stand-off member 74, with the longitudinal axis of wings 78 being disposed parallel to the central longitudinal axis of stand-off member 74. A portion of wings 78 extends beyond the end of stand-off member 74 to which they are welded, and are provided at their ends with through holes for the receipt of a quick release fastener such as quick-pin 26. Wings 78 extend at a sufficient distance from the end of stand-off member 74, and the through holes for receipt of quick-pin 26 are so positioned in wings 78 as to provide a snug fit for stablizer bar 18 when it is connected with a rung 22 of folding ladder 12. A means 80 for attaching stablizer bar 18 to a tree is connected to cross member 76 by means of bolts 82 which are inserted in holes formed at the ends of cross member 76. Means 80 for attaching stablizer bar 18 to tree T comprise a conventional, commercially available turnbuckle 84 and chain 86. Stablizer bar 18 is connected to a rung 22 of folding ladder 12 at the lower portion of the folding ladder, in other words, that portion of the folding ladder which is closest to the ground when the folding ladder is positioned against a tree for use. Stablizer bar 18 holds tree stand 10 away from the tree and prevents the tree stand from falling away from the tree, from twisting, or from turning with respect to the tree.

Figure 5:
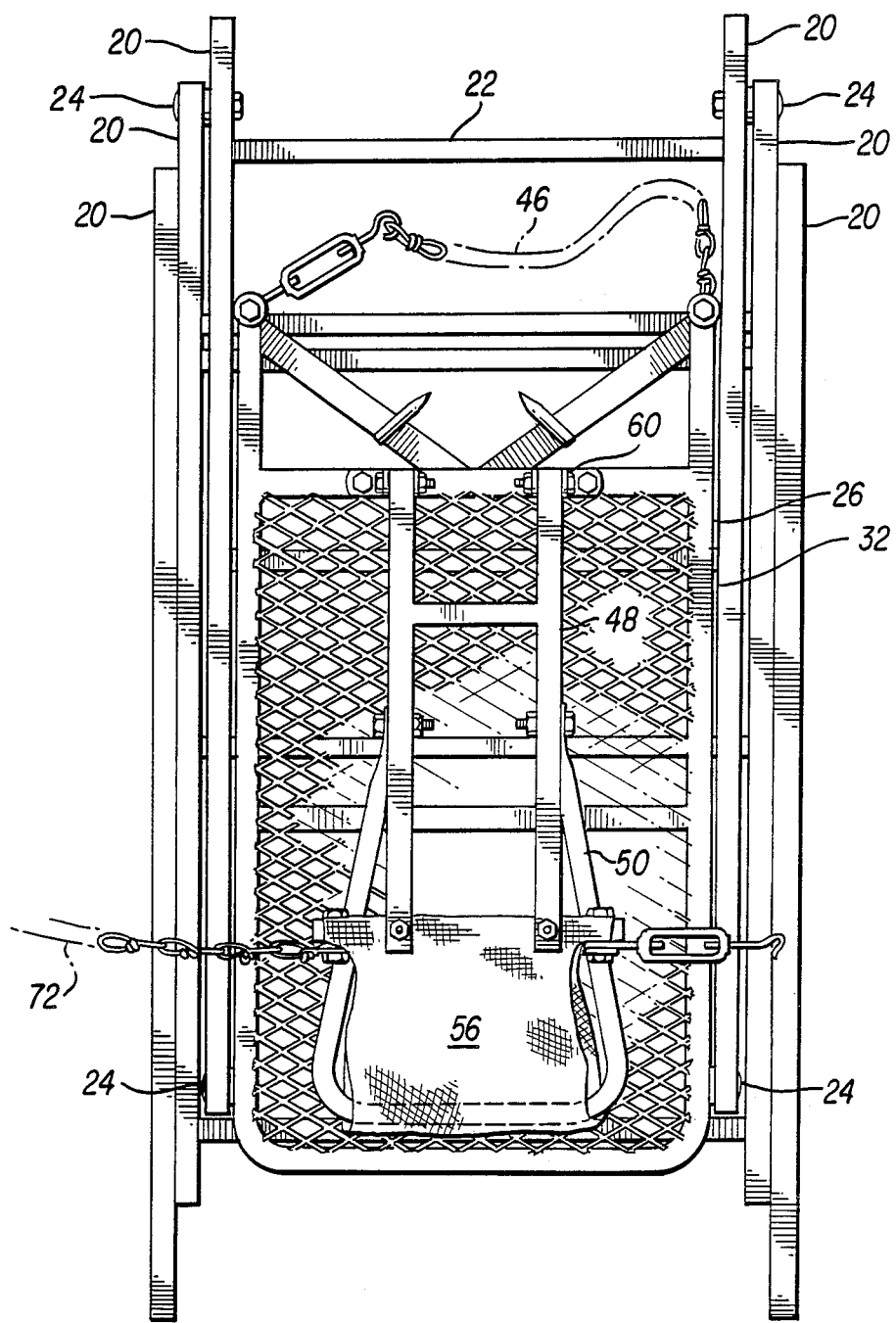
FIG. 5 is a plan view of the folding ladder stand of the invention in a collapsed position ready for transport or storage.

Referring now to FIG. 5 of the drawings, the folding ladder stand of the invention is shown in a collapsed position ready for transport or storage. Each of the quick release fasteners 26 has been removed from their positions within the side rails 20 of folding ladder 12. The upper, middle, and lower segments of folding ladder 12 have been pivoted about bolts 24 so that they telescopingly fit within one another, due to the varying lengths of rungs 22 within each of the three segments, as explained hereinabove. Quick release fasteners 26 have also been removed from their positions within side bars 32 and the side bars have been pivoted about bolts 34 connecting sides bars 32 to platform frame 26 so that side bars 32 are parallel to and coextensive with platform frame 26, thereby also allowing platform frame 26 to be pivoted parallel to and so as to fit within side rails 20. Angular seat support 50 has been pivoted upwardly with respect to central supports 48 of seat 16 which is allowed due to the flexibility of fabric member 56, and central supports 48 have been pivoted within bracket 60 so that collapsible seat 16 is folded nearly flush with platform frame 26 and ladder side rails 20. Stablizer bar 18 has been removed from its position on rungs 22 and is not illustrated in FIG. 5. The entire ladder stand 10 is thus folded compactly into a low profile package and is easily transported and stored in its folded condition. Additionally, chains 46 and 72 may be wrapped around the folded ladder stand and connected with their respective turnbuckles so as to provide a neat storage of the chains and to prevent the various folded parts from inadvertently pivoting when the folded ladder is tilted during transport or while in storage.

Referring once again now to FIGS. 1-7 of the drawings, the set up and usage of the folding ladder stand will be described. The entire folding ladder stand is first transported, in its folded condition, as shown in FIG. 5, together with stablizer bar 18 to the tree or upright where it is desired to be put in use. The folded ladder stand is then placed on the ground and unfolded to its full length by pivoting the opposed side rails 20 of the upper, middle, and lower segments of folding ladder 12 about bolts 24. Quick release fasteners 26 are then inserted and clipped into place to rigidly fix the three segments to form a ladder. Platform frame 26 is then pivoted so as to be perpendicular with respect to side rails 20, side bars 32 are then pivoted into position on side rails 20 and quick release fasteners 26 are inserted to connect side bars 32 with side rails 20 to support platform 14 perpendicularly with respect to folding ladder 12. The unfolded ladder stand is then lifted and placed in position against tree T, as shown in FIGS. 1 and 2, with stakes 38 of angle members 36 resting firmly against tree T, as shown in FIG. 3. Stablizer bar 18 is next positioned about a rung 22 adjacent the lower portion of folding ladder 12, as shown in FIG. 7, and firmly attached to tree T by wrapping chain 86 around the tree, engaging a length of the chain with the hook of turnbuckle 84, and then tightening turnbuckle 84 to firmly engage tree T, as shown in FIG. 2. Ladder stand 10 is now firmly attached to tree T and ladder 12 may be safely climbed to complete the attachment of ladder stand 12 to tree T. The ladder stand user now climbs the ladder 12 and mounts top platform 14. Platform 14 is next firmly secured to tree T by wrapping chain 46 around the tree, engaging an appropriate link of the chain with the hook of turnbuckle 44, and tightening the turnbuckle. Collapsible seat 16 is next firmly secured to tree T by pivoting angular seat support 50 downwardly with respect to central supports 48, pivoting central supports 48 upwardly from platform frame 26 toward tree T, wrapping chain 72 around tree T, engaging an appropriate link of chain 72 with the hook of turnbuckle 70, and tightening the turnbuckle 70, as shown in FIGS. 3 and 4. The user may now sit in seat 16 which is safe and secure due to the double engagement of seat 16 and platform 14 with tree T by attachment means 66 and 42, respectively. Additionally, the user is protected against ladder stand 10 twisting, turning, or falling from tree T due to the rigid and secure connection of stablizer bar 18 at the lower portion of ladder 12.

If it is desired, the ladder stand may be used without seat 16, by disassembling bracket 60 from platform frame 26 and removing seat 16 from the ladder stand. In this case, stablizer bar 18 is still used, together with attachment means 80, to secure the lower portion of ladder 12 to the tree.

Although only preferred embodiments are specifically illustrated and described therein, it will be appreciated that many modifications and variations of the present invention are possible in light of the above teachings and within the purview of the appended claims without departing from this spirit and intended scope of the invention.

I claim:

1. A manually-portable combination foldable ladder and tree stand, comprising:
   a platform connected to the upper end of said foldable ladder;
   means connected to said foldable ladder for attaching said foldable ladder to a tree;
   said ladder having a plurality of foldable stages; and
   means for folding said combination foldable ladder and tree stand relatively flat so that each of said stages and said platform are in the same plane for transportation of said combination foldable ladder and tree stand.

2. A manually-portable combination foldable ladder and tree stand, comprising:
   a platform connected to the upper end of said foldable ladder;
   means connected to said foldable ladder for attaching said foldable ladder to a tree;
   said ladder including a plurality of foldable stages, each stage having two opposed rails and rungs;
   wherein each stage is pivotably connected to at least one other stage for movement between a position in which said ladder is adapted for climbing and a position in which said ladder is folded for transportation;
   wherein the distance between the rails of each of said stages is different; and
   the width of said platform is less than smallest distance between rails of the stages;

whereby said combination foldable ladder and tree stand is able to fold relatively flat with each of said stages and said platform being in the same plane for transportation of said combination foldable ladder and tree stand.

3. The combination foldable ladder and tree stand of claim 2 adapted to be attached to an upright, further comprising a rigid, stand-off member provided adjacent the lower portion of the ladder frame, said stand-off member being provided with further means for attachment to said upright.

4. The combination foldable ladder and tree stand of claim 2 further comprising:
a collapsible seat mounted on said platform; and
means connected to said collapsible seat for attaching said collapsible seat to a tree.

5. The combination foldable ladder and tree stand of claim 2 further comprising:
a collapsible seat connected with said platform;
said collapsible seat comprising a frame for the support of a fabric member to be used as said seat.

6. The folding ladder stand of claim 3 wherein said ladder frame comprises opposing side rails and rungs interconnecting said opposing side rails, and said stand-off member comprises a bar having means for attaching said bar with one of said rungs disposed at one end of said bar, and said further means for attachment to said upright being disposed at the other end of said bar.

7. The folding ladder stand of claim 6 wherein said bar further comprises a perpendicular cross member and said further means for attachment to said upright comprises a chain and turnbuckle connected to the ends of said cross member.

8. The folding ladder stand of claim 7 wherein said means for attaching said bar to one of said rungs comprises a pair of wings connected to said bar and extending beyond the end of said bar in the longitudinal direction of said bar, and a quick release fastener removably attached to said wings.

9. The folding ladder stand of claim 8 further comprising a collapsible seat supported above said platform.

10. The folding ladder stand of claim 4 wherein said ladder frame further comprises a plurality of segments pivotally connected to one another and moveable between a folded position and an unfolded position, said segments having means for removably attaching therebetween a plurality of quick release fasteners whereby said quick release fasteners are attached to said segments to rigidly support said segments in the unfolded position and said quick release fasteners are removed from said segments when said segments are in the folded position.

11. The combination foldable ladder and tree stand of claim 4 wherein said platform comprises a frame pivotally connected at one end to said upper end of said folding ladder and at the other end of said frame to said means for attaching said platform to a tree, and said means for attaching said platform to a tree comprises a chain and turnbuckle.

12. The combination foldable ladder and tree stand of claim 11 wherein said collapsible seat comprises a pair of central supports pivotally connected their lower ends to said platform frame, said means, for attaching said collapsible seat to a tree is connected to the upper ends of said central supports, and said means for attaching said collapsible seat to a tree comprises a chain and turnbuckle.

13. The combination foldable ladder and tree stand of claim 12 wherein said collapsible seat further comprises an angular seat support pivotally connected to said central support, a cross member connected to and interconnecting said central support at the upper ends of said central support, and said means for attaching said collapsible seat to a tree are connected to the ends of said cross member.

14. The combination foldable ladder and tree stand of claim 13 wherein said platform frame further comprises an elongated tubular member bent at two places into a 90° angle to form a U-shaped member having opposite platform frame arms adapted to flank a tree, a pair of cross members connected transversly to said opposite platform frame arms between said platform frame arms to form a rigid platform frame structure, and a wire mesh platform supported on said platform frame structure.

15. The combination folding ladder and tree stand of claim 14, wherein said platform further comprises a pair of angle members each of which is connected to one of the ends of the elongated tubular member of the platform frame and to the cross member of the platform frame which is closest to the ends of the tubular member of the platform frame, and each angle member is provided with a shapened stake, whereby said platform frame is adapted to firmly grip a tree.

16. The combination folding ladder and tree stand of claim 15 wherein said collapsible seat further comprises a bracket mounted on the cross member of the platform frame which is closest to the ends of the tubular member of the platform frame and the lower ends of the pair of central supports of the collapsible seat are pivotally mounted within said bracket whereby said collapsible seat is pivotable between a position in which said pair of central supports is flush with the platform frame when the seat is not in use, and a position in which said pair of central supports are vertical with respect to the platform frame to allow attachment of said collapsible seat to a tree when said seat is in use.

17. The combination folding ladder and tree stand of claim 16 wherein said platform frame is provided with a pair of longitudinal extending side bars pivotally supported on the outside of said opposite platform frame arms for movement between a folded position in which said side bars are longitudinally coextensive with said platform frame arms and an unfolded position in which said side bars form a angle with respect to said opposite platform frame arms and are adapted to be attached to the opposite side rails of said ladder frame for horizontal support of said platform when said combination folding ladder and tree stand is in position on a tree.

18. The combination foldable ladder and tree stand of claim 5 wherein said collapsible seat further comprises means connected to said collapsible seat for attaching said collapsible seat to a tree.

19. The combination foldable ladder and tree stand of claim 18 wherein the frame of said collapsible seat comprises a pair of central supports pivotally connected at their lower ends to said platform, a cross member connected to the upper ends of said central supports, an angular seat support pivotally connected to said central supports at a location between the upper and lower ends of said central supports, and wherein said fabric member is stretched between said cross member and said angular seat support.

20. The combination foldable ladder and tree stand of claim 19 wherein said means for attaching said collapsible seat to a tree comprises a chain and turnbuckle connected to the ends of said cross member connected to the upper ends of said central supports.

21. The combination foldable ladder and tree stand of claim 20 wherein said collapsible seat further comprises a bracket mounted on said platform and said collapsible seat is pivotably mounted within said bracket for movement between a folded position in which said central supports are flush with said platform and an unfolded position in which said central supports are vertical with respect to the platform to allow attachment of said collapsible seat to a tree when said seat is in use.

22. The combination foldable ladder and tree stand of claim 21 in which said platform is connected to means for attaching said platform to a tree.

* * * * *

UNITED STATES PATENT AND TRADEMARK OFFICE
CERTIFICATE OF CORRECTION

PATENT NO. : 4,742,888
DATED : May 10, 1988
INVENTOR(S) : JOSEPH A. AMACKER

It is certified that error appears in the above-identified patent and that said Letters Patent is hereby corrected as shown below:

IN THE CLAIMS:

Claim 10, line 1, "claim 4" should be --claim 9--.

Claim 12, line 4, after "means" delete ",".

Signed and Sealed this

First Day of November, 1988

Attest:

DONALD J. QUIGG

Attesting Officer

Commissioner of Patents and Trademarks